United States Patent
Mendelson et al.

(10) Patent No.: US 6,343,083 B1
(45) Date of Patent: Jan. 29, 2002

(54) METHOD AND APPARATUS FOR SUPPORTING A CONNECTIONLESS COMMUNICATION PROTOCOL OVER AN ATM NETWORK

(75) Inventors: Jeffrey B. Mendelson, Petaluma; K. Martin Stevenson, III, San Rafael; Mowaffak T. Midani, Petaluma; Marcus A. Maranhao, Rohnert Park; Michael J. Donahue, Sebastopol; Jean Francois Van Kerckhove, San Francisco, all of CA (US); Wayne R. Roiger, Saint Michael, MN (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/057,872

(22) Filed: Apr. 9, 1998

(51) Int. Cl.⁷ ............................................. H04L 12/46

(52) U.S. Cl. .................... 370/466; 370/395.5; 370/392

(58) Field of Search ................................ 370/466, 465, 370/389, 392, 395, 489, 473, 410, 397

(56) References Cited

U.S. PATENT DOCUMENTS

| | | | |
|---|---|---|---|
| 5,581,552 A | | 12/1996 | Civanlar et al. ............ 370/396 |
| 5,764,645 A | * | 6/1998 | Bernet et al. ............... 370/466 |
| 5,828,844 A | * | 10/1998 | Civanlar et al. ........ 395/200.58 |
| 5,831,975 A | * | 11/1998 | Chen et al. .................. 370/256 |
| 5,903,559 A | * | 5/1999 | Acharya et al. ............ 370/355 |
| 5,909,446 A | * | 6/1999 | Horikawa et al. .......... 370/469 |
| 5,912,891 A | * | 6/1999 | Kanai .......................... 370/395 |
| 5,936,936 A | * | 8/1999 | Alexander, Jr. et al. .... 370/216 |
| 5,996,021 A | * | 11/1999 | Ciuanlor et al. ............ 209/238 |
| 6,009,097 A | * | 12/1999 | Han ............................. 370/395 |
| 6,016,319 A | * | 1/2000 | Kshirsagar et al. ........ 370/410 |

FOREIGN PATENT DOCUMENTS

EP    0 552 385 A1    7/1993    ........... H04L/12/56

OTHER PUBLICATIONS

ITU–T Recommendation Q.2931, "Broadband Integrated Service Digital Network (B–ISDN) Digital Subscriber Signalling System No. 2 (DSS2) User–Network Interface (UNI) Layer 3 Specification for Basic Call/Connection Control" (Sep. 1994).

The ATM Forum, "ATM User–Network Interface Specification," Version 3.1 (Sep., 1994).

(List continued on next page.)

*Primary Examiner*—Douglas Olms
*Assistant Examiner*—Ken Vanderpuye
(74) *Attorney, Agent, or Firm*—Jackson Walker L.L.P.

(57) ABSTRACT

Method for managing connections on a connection-oriented network such as an ATM network, for use with devices communicating according to a connectionless communication protocol such as IP over Ethernet. Roughly described, a bridging network element (BNE) resides at the ATM point-of-presence through which a data network accesses the ATM network. When the BNE receives an internet ARP (IARP) request from the data network for forwarding onto the ATM network, it forwards it instead to an IARP server. In addition to responding to the IARP request, the IARP server also regards the IARP request as a trigger, and in response thereto, causes the ATM network to establish a connection between the BNE point-of-presence and another point-of-presence on the ATM network through which the target address can be reached. Connection time-out periods are chosen to exceed or to be very likely to exceed the address resolution cache age-out periods on the client devices, thereby ensuring that after a connection timeout, the client device will or will be very likely to transmit another IARP request before it begins streaming transmission of more data packets onto the ATM network.

36 Claims, 5 Drawing Sheets

OTHER PUBLICATIONS

ATM Forum, "ATM User–Network Interface Signalling Specification," Version 4.0 (UNI 4.0), af–sig–0061.000 (Jun. 1996).

ITU–U Reccomendation No. Q 2971, "Digital subscriber signalling system No. 2 (DSS 2) û User–network interface layer 3 specification for point–to–multipoint call/connection control".

M. Maher, "ATM Signalling Support for IP over ATM— UNI 4.0 Update," internet–draft draft–ietf–ion–sig–uni4.0–02.txt, Mar. 1997.

R. Braden, "Requirements for Internet Gateways," Network Working Group, Request for Comments: 1009 (Jun. 1987).

J. Postel, "A Standard for the Transmission of IP Datagrams over IEEE 802 Networks," Network Working Group, Request for Comments: 1042 (Feb. 1988).

David C. Plummer, "An Ethernet Address Resolution Protocol," Network Working Group, Request For Comments: 826 (Nov. 1982).

Bertsekas, "Data Networks," pp. 14–26 (1987).

M. Laubach, "Classical IP and ARP over ATM," Request for Comments No. 1577 (1994).

M. Perez, "ATM Signaling Support for IP over ATM," Request for Comments No. 1755 (1995).

Heinanen, "Multiprotocol Encapsulation over ATM Adaptation Layer 5," Request for Comments No. 1483 (1993).

ATM Forum, "LAN Emulation Over ATM Version 1.0," ATM Forum, Mountain View, California (Jan. 1995).

ATM Forum, LAN Emulation Client Management Specification Version 1.0 (Sep. 1995).

ATM Forum, LAN Emulation Over ATM Version 1.0 Addendum (Dec., 1995).

ATM Forum, LAN Emulation Servers Management Specification 1.0 (Mar. 1996).

* cited by examiner

METHOD AND APPARATUS FOR SUPPORTING A CONNECTIONLESS COMMUNICATION PROTOCOL OVER AN ATM NETWORK

BACKGROUND OF THE INVENTION

1. Field of the Invention

The invention relates to techniques for carrying messages of one protocol over networks of a different protocol. More particularly, the invention involves a technique for carrying messages of a connectionless protocol, such as IP over Ethernet, over a connection-oriented network, such as an ATM network.

2. Description of Related Art

The various nodes or network elements (NE's) of a computer data network communicate with each other via commonly agreed upon communication protocols. These protocols have different layers or levels, each defining a different aspect of the protocol. Each different layer can be thought of as a sub-protocol of the overall protocol, but can also be thought of as a protocol in itself. All of the sub-protocols which together define an overall protocol are often referred to as a "protocol stack". The interface between the different layers of a stack are well-defined, so different alternative sub-protocols can be substituted for other sub-protocols at the same layer in the stack.

One very common protocol used for computer networking is the so-called Internetworking Protocol (IP). IP is a network layer service and includes provisions for addressing, type-of-service specification, fragmentation and reassembly, and security information. It is defined- in a series of documents maintained by the Internet Engineering Task Force (IETF), most notably, J. Postel, "Internet Protocol," STD0005 (September 1981) (including RFC0791, RFC0950, RFC0919, RFC0922, RFC792, RFC1112), incorporated herein by reference. IP defines a protocol to be used at one layer of the overall communication protocol, specifically the "network" protocol layer. Several common alternative network-level protocols are IPX (defined in Novell, Inc., "Advanced NetWare V2.1 Internetwork Packet Exchange Protocol (IPX) with Asynchronous Event Scheduler (AES)", October 1986, incorporated by reference herein); DECnet; and Xerox PUP. Many modern local area networks (LANs) use an Ethernet protocol as the next layer below IP. Ethernet includes a Media Access Control (MAC) layer protocol, and is defined in IEEE, "IEEE Standards for Local Area Networks: Carrier Sense Multiple Access with Collision Detection (CSMA/CD) Access Method and Physical Layer Specifications" (IEEE Standard No. 802.3) (1985), incorporated herein by reference. When IP and Ethernet are used together in a protocol stack, the combined protocol is sometimes referred to herein as "IP over Ethernet". Similarly, when IPX, DECnet or Xerox PUP are carried over Ethernet, the combined stack is sometimes referred to herein as "IPX over Ethernet", "DECnet over Ethernet" and "PUP over Ethernet", respectively.

The basic unit of data at the network layer is often referred to as a "datagram" (e.g. an "IP datagram"), whereas the basic unit of data at the MAC level is often referred to as a "packet" (as in "Ethernet packet"). Datagrams must be "encapsulated" according to the MAC level protocol in order to be transmitted, which may involve breaking them up into multiple packets. Similarly, the recipient node must extract and re-assemble the datagram from one or more MAC level packets in order to make use of it. Also as used herein, a "message" is a logical data unit that is not intended to imply any particular encapsulation. Some messages are bigger than a datagram, in which case they need to be divided up into multiple datagrams (and then multiple packets) in order to be transmitted. Other messages consist of a single packet, such as an ARP Request packet.

Wide Area Networks (WANs) typically take advantage of existing communications media for carrying messages over great distances. In particular, usually, the different nodes of a WAN communicate with each other via existing telephony networks such as Integrated Services Digital Networks (ISDN) or Broadband ISDN (B-ISDN). Very often, the telephony network is used to connect a subscriber's data network to an Internet Service Provider (ISP), or a subscriber's home office network to his or her central office network. ISDN and B-ISDN networks have their own protocols for transmitting messages, and when two computer networks need to communicate with each other via a telephony communications path, adapters are usually necessary on both ends of the telephony network to convert messages from a computer networking protocol to an ISDN or B-ISDN protocol and vice-versa.

Telephony protocols, having been designed historically for voice traffic (i.e., telephone calls), are usually connection-oriented protocols. That is, they proceed first with a set-up phase, in which a calling party specifies the "address" (e.g., phone number) of a called party, and the network establishes a "connection" between them. All subsequent communication between the two parties then takes place via the established connection, and no further addressing is needed. At the conclusion of the conversation, the connection is released, or "torn down", releasing the telephony network resources for other connections. Connection-oriented networks and protocols are most cost effective in situations where it is expected that one node will communicate with a second node for a fairly lengthy period of time. Such protocols assume that it is less expensive to take the time and resources for a connection set-up phase than it would cost to examine and properly forward individually addressed message units which, at least for voice traffic, are all likely to be addressed to the same destination for a long period of time.

Computer data communication protocols, on the other hand, are often connectionless protocols, at least at the lowest levels. That is, no "connection" is established between the two communicating nodes at these protocol levels; rather, each message unit contains the address of its destination. Each node that receives packets examines the destination address of the packet in order to determine whether to take or ignore the packet. Connectionless protocols, sometimes also called packet-switched protocols, are most cost effective in computer data networks because traffic in such networks typically consists of numerous messages directed to many different destinations, with a lengthy communication to a single destination taking place only rarely.

Note that a given protocol stack can be connection-oriented or connectionless at different levels. It is even possible for a protocol stack to be connection-oriented at two different layers and connectionless at an intermediate layer, or vice versa. IP and IPX over Ethernet are both connectionless, for example, although higher levels in the stack might well be connection-oriented.

One commonly used connection-oriented protocol is known as ATM (Asynchronous Transfer Mode), defined in a number of specifications published by the ATM Forum, including: ATM Forum, "ATM User-Network Interface Specification Version 3.1," ATM Forum, Mountain View, California (September, 1994) ("UNI 3.1"); ATM Forum, "ATM User-Network Interface (UNI) Signaling Specification Version 4.0," ATM Forum, Mountain View, California (July 1996) ("UNI 4.0"); and International Telecommunication Union, "Broadband Integrated Services Digital Network (B-ISDN)—Digital Subscribers Signaling System No. 2 (DSS 2)—User-Network Interface (UNI) Layer 3 Specification for Basic Call/Connection Control," ITU-T recommendation Q.2931 (February 1995) ("Q.2931"), all incorporated by reference herein. The term "ATM network," as used herein, refers to a network that conforms to these documents in all relevant respects, whether or not it also conforms to more recent or other specifications as well.

When two parties wish to communicate over a connection-oriented network such as an ATM network, the network establishes a connection from the "point of presence" (or "endpoint") on the connection-oriented-network, through which a first device (e.g. a telephone or a host computer) reaches the network, to the "point of presence" (or "endpoint") on the connection-oriented network through which the second or destination device can be reached. For data connections, for example, each such endpoint on the connection-oriented network has an "adapter" which interfaces the connection-oriented network protocol, on one hand, to the data protocol, on the other hand. Such an adapter may be located entirely within a host computer which is itself an endpoint for data communications, in which case the host computer is referred to herein as an "endsystem" of the connection-oriented network and the "adapter" comprises a level of software in the host computer's protocol stack (below the MAC layer). Alternatively, the adapter may be located within a termination unit of the connection-oriented network, which termination unit is connected on one side to the connection-oriented network and on the other side to a computer data network. The ultimate endpoint for the data communication is located in another node on the computer data network. In this alternative, the "adapter" still comprises a layer of software in a protocol stack, but the protocol stack typically extends only as high as the MAC layer or the network layer. If the protocol stack on the termination unit extends only as high as the MAC layer, then the unit is viewed from the data network as a "bridge", also called a bridging network element (BNE). If the protocol stack on the termination unit extends as high as the network layer, then the unit is viewed from the data network as a "router", also called a routing network element.

When an adapter accepts a packet from a computer data network, the adapter needs to be able to determine whether to transmit it on the connection-oriented network over an existing connection or to create a new connection, and if the latter, which connection-oriented network endpoint to target and what parameters should be used in the new connection. More specifically with respect to a bridging or routing ATM adapter, the adapter needs to be able to determine whether the destination MAC or IP address is reachable via an existing ATM virtual connection (VC) and, if so, which one. If the destination node is not reachable via existing VC's, the adapter needs to be able to determine whether the destination is reachable at all over the ATM network, and if so, what ATM address, quality of service, security parameters and other parameters to use in establishing a new VC. These issues are addressed partially in several internet-related documents proposing standards for the transmission of IP datagrams over ATM networks. Such documents include the following, all incorporated by reference herein:

M. Laubach, "Classical IP and ARP over ATM," Request for Comments No. 1577 (1994) ("RFC 1577")

M. Perez, "ATM Signaling Support for IP over ATM," Request for Comments No. 1755 (1995) ("RFC 1755")

M. Maher, "ATM Signalling Support for IP over ATM— UNI 4.0 Update," file draft-ietf-ion-sig-uni4.0-02.txt (March 1997) ("UNI 4.0 Update")

Heinanen, "Multiprotocol Encapsulation over ATM Adaptation Layer 5," Request for Comments No. 1483 (1993) ("RFC 1483")

The above documents mostly assume a network architecture having a plurality of ATM endpoints, each of which has an adapter which interfaces the ATM endpoint with an IP (or other network layer) protocol stack. According to the documents, each ATM adapter maintains a map indicating which IP addresses are reachable via each VC that it has. ATM adapters are also permitted to maintain a cache of recently confirmed IP-to-ATM address translations, whether or not they are reachable on any current VC. When an IP client (software or hardware) directs an IP packet to an IP destination, and it is accepted by the ATM adapter, then the adapter encapsulates it according to a predefined ATM protocol (know as AAL5) and sends it on via an existing VC to the ATM adapter through which the destination IP address can be reached. If no VC is currently established between these adapters, then the originating adapter checks its local cache of IP-to-ATM address translations for the address of a destination ATM adapter through which the destination IP address can be reached, and if present and valid, "calls" the destination adapter to set up a new Switched Virtual Circuit (SVC) before transmitting data. If the desired IP-to-ATM address translation is absent or invalid in the local cache, then the ATM adapter uses an ATM Address Resolution Protocol (ATMARP) protocol to request the translation. According to this protocol, the ATM adapter creates an ATMARP request encapsulated in an ATM cell, containing the desired destination IP address, and sends it to a so-called ATMARP server on the ATM network. The ATM adapter uses a pre-provisioned (or at least pre-identified) point-to-point ATM connection to transmit the ATMARP request. The ATMARP server then examines its own cache of IP-to-ATM address translations, and returns an ATMARP reply message specifying the ATM address through which the destination IP address can be reached. The originating ATM adapter adds the translation to its local cache, "calls" the destination ATM adapter, and proceeds to transmit data on the resulting SVC.

One significant problem with the techniques of the above described documents is that they are expensive to implement in an ATM adapter. Ideally, ATM adapters should be low cost, relatively simple devices which do not do much more than interface between ATM on one side and the data network protocol on the other side. Requiring the ATM adapter to also understand ATMARP and other similar protocols would likely increase both the cost and complexity of the unit.

A second major problem with the above techniques is that the process of transmitting ATMARP requests to an ATMARP server and awaiting a response, as well as the process of establishing a connection across the ATM network once the target ATM network address is known, can take a very long time, in data transmission terms. During this time, the client device (e.g., a host computer on the data network) that originated the data packets which instigated the new connection, has no way to know that a delay has occurred. Thus it continues to transmit data packets on the local data network typically at a high rate of speed. If the ATM adapter attempts to buffer the packets while it awaits completion of the SVC, the data storage requirements of the ATM adapter can become enormous, especially, for example, if the local data network operates at 100 Mb/s or more. Alternatively, the ATM adapter can ignore packets that it cannot buffer, in which case a requirement is imposed on higher level software in the originating host (or on a human user) to determine that packets were lost and to retransmit.

A second problem with the above techniques arises especially when the ATM network is a telephony ATM network. Such networks have been designed historically to carry primarily voice traffic. Voice calls typically last on the order of three to five minutes, and ATM networks have typically been built with the capacity to handle calls of approximately that duration. The capability of connecting data networks to a telephony ATM network, on the other hand, raises the spectre of many subscribers connecting to internet service providers (ISP's) (or to private office LANs) over the ATM network. These kinds of connections typically last on the order of 20–30 minutes each, much longer than an average voice call. Most conventional telephony networks are not designed to handle such lengthy calls on a regular basis without seriously impacting the availability of telephony resources for other subscribers.

SUMMARY OF THE INVENTION

The invention solves the above problems regarding when and how to establish connections across a connection-oriented network for data traffic, in a manner that takes advantage of a known solution to the additional and separate problem of data communications over an ATM network, namely how to handle broadcast packets received over a LAN by a BNE for forwarding over the non-broadcast ATM network. The latter problem arises because data network protocols often include a "broadcast" form of addressing, whereas ATM does not. In the Ethernet protocols, for example, certain kinds of data packets have no addressee or the addressee is unknown. Such is the case with IARP request packets, for example. In these kinds of data packets, the destination Ethernet address listed in the header of the packet is specified as all ones. Each node on a subnet which receives a broadcast packet is expected to determine for itself whether it should respond. Again in the case of IARP request packets, each node is expected to look inside the packet and determine whether its own IP address matches the IP address for which a corresponding MAC-level address is being requested. If so, then the node is expected to reply with an IARP reply packet. If not, then in most cases the node is expected to ignore the packet. (An exception is a node which is also an IARP server, which is expected to respond on behalf of the targeted device.)

The bridging network elements on a data network are not considered "nodes" for the purpose of replying to broadcast packets. Bridges are intended to make the physical media on both sides of the bridge appear as a single subnet. Thus, when a bridge receives a broadcast packet on one port, it merely copies it to the other port. With respect to the Internet address resolution protocol, many bridges attempt to improve scaling characteristics by capturing ARP packets and cacheing the content, so that the bridge can respond to future IARP requests for the same translation without having to pass the request onto other parts of the subnet. This technique is known as "proxy ARP", because the bridge acts as a "proxy" for the true node in responding to the IARP request.

ATM networks, as mentioned above, do not support broadcast capability. That is, they do not natively support a convenient addressing mode by which a data unit can be translated to all points of presence on the ATM network. ATM does include a "multi-cast" capability, in which a single data unit can be transmitted to a pre-established group of more than one ATM endpoint, but it is implemented by simply replicating the data unit and transmitting it separately to all the targeted points of presence. The above-incorporated RFC 1483 document teaches that an ATM interface acting as a bridge must be able to "flood", that is, send the broadcast packet to all possible appropriate destinations. In the ATM environment, this means sending the packet through every relevant VC that it has. But if each recipient bridging network element abides by this rule and retransmits the packet through all of its own relevant VCs, and if each recipient of those transmissions retransits the packet through all of its relevant VCs, then it can be seen that such a flooding rule can easily result in a broadcast storm rippling through a good part of the ATM network.

The ATM Forum has developed a set of protocols ("LAN-E") for emulation of Ethernet LANs over an ATM network, and these are described in several publicly available documents including ATM Forum, "LAN Emulation Over ATM Version 1.0," ATM Forum, Mountain View, California (January 1995); LAN Emulation Client Management Specification Version 1.0 (September 1995); LAN Emulation Over ATM Version 1.0 Addendum (December, 1995); LAN Emulation Servers Management Specification 1.0 (March 1996), all incorporated by reference herein. These documents call for an ATM network supporting LAN emulation to include a centralized Broadcast and Unknown Server (BUS). When a LAN Emulation Client (LEC) receives a broadcast packet for forwarding onto the ATM network, the LEC does not "flood." Instead, it forwards the broadcast packet only to the BUS for handling. The BUS may in turn flood, depending on the packet.

Roughly described, Applicants' invention also involves the forwarding of broadcast-addressed packets on to a single controller for handling, at least to the extent of forwarding IARP request packets. In an implementation of the invention, the predefined controller can act as an IARP server and return an IARP reply packet if the desired information is available. More importantly, however, the controller also uses the IARP request message as a trigger for the establishment of a connection across the connection-oriented network to the appropriate destination.

More particularly, still roughly described, whenever a BNE receives an IARP request message on its data port for forwarding onto a connection-oriented network, instead of flooding, the BNE forwards the message to a predefined controller. The controller then regards the IARP message as a trigger, and in response thereto, causes the connection-oriented network to establish a virtual connection between the point-of-presence through which the BNE accesses the connection-oriented network, to the point-of-presence through which the destination data network address, as indicated in the IARP request message, can be reached.

Other aspects, features and advantages of the invention are set forth in more detail in the drawings, the claims and in the Detailed Description below.

BRIEF DESCRIPTION OF THE DRAWINGS

The invention will be described with respect to particular embodiments thereof, and reference will be made to the drawings, in which.

DETAILED DESCRIPTION

Figure 1:
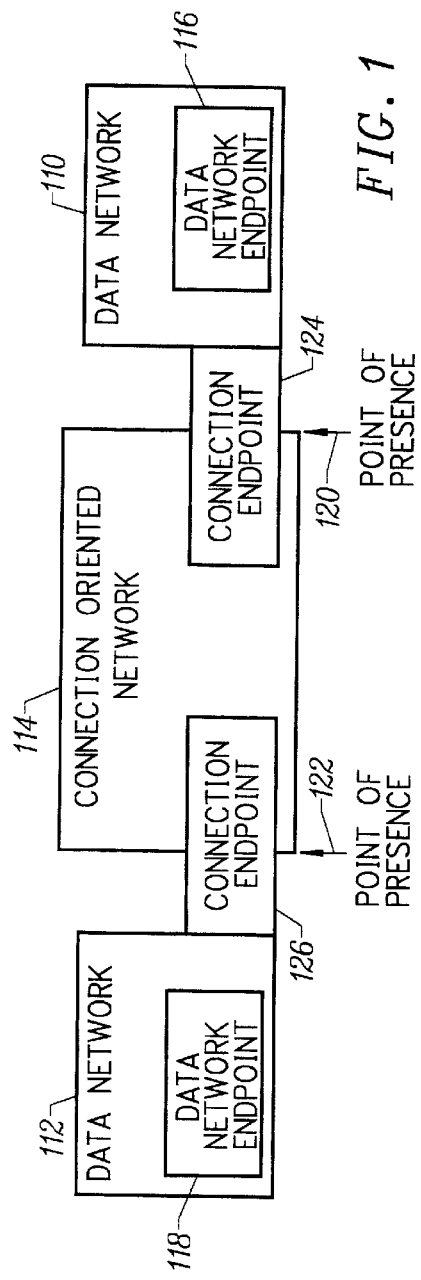
FIG. 1 is a block diagram of a generalized network architecture incorporating features of the invention.

FIG. 1 is a block diagram of a generalized architecture which includes two data networks 110 and 112 communicating with each other via a connection-oriented network 114. The data network 110 uses a connectionless protocol at the lowest levels of the protocol stack, such as, for example, IP over Ethernet. The data network 110 includes a client device having a data network endpoint 116, which either originates or terminates messages transmitted across a subject communication path to or from another data network endpoint 118 in the data network 112. The data network endpoint 116 is considered herein to be a layer of software (for example, an application program on a host computer, or routing decision-making software on a router) which is above the network layer of the protocol stack of the data network 110. If the data network 110 includes a LAN, then the data endpoint 116 can be part of a host computer connected to the LAN.

The data network 112 can in some embodiments have the same structure as the data network 110, and in other embodiments can be structured according to one of the other variations described above with respect to data network 110. In one example scenario, the data network 110 is a user's home office network, whereas the data network 112 is located at the user's company site. Another typical scenario, the data network 110 is located at a residence or business location, and the data network 112 belongs to an Internet Service Provider (ISP). Numerous other scenarios can be implemented using the structure of FIG. 1.

The connection-oriented network 114 in FIG. 1 can be, for example, a telephony network with an ATM backbone. It can have any number of network segments, as long as it provides a communication path between a point of presence 120, through which the data network 110 reaches the connection-oriented network 114, and another point of presence 122, through which the data network 112 reaches the connection-oriented network 114. A network is referred to herein as "connection-oriented" if it is connection-oriented at both opposite points of presence along the communication path through the network, even if one or more internal segments are actually connectionless.

The connection-oriented network 114 establishes "connections" between the various points of presence on the connection-oriented network 114, and each connection has different "connection endpoints" located at respective different points of presence. In the diagram of FIG. 1, connection endpoint 124 is located at point of presence 120, and connection endpoint 126 is located at point of presence 122. From the point of view of the connection-oriented network 114, its primary task is to carry information from one connection endpoint to the other. The connection-oriented network 114 does not necessarily require any knowledge about the ultimate source or destination of the information that it carries, which in the structure of FIG. 1, are the data network endpoints 116 and 118.

The connection endpoints 124 and 126 are illustrated symbolically in FIG. 1 as being partially within and partially without the connection-oriented network 114. This is because the connection endpoints each include one portion which understands the connection-oriented protocol used on network 114 but does not understand the connectionless protocol used on the data networks 110 and 112, and another portion which understands the protocol used on the data networks 110 and 112, but does not understand the protocol used on the connection-oriented network 114. The portion which understands the connection-oriented network protocol, which may be implemented in hardware and/or software, is referred to herein as a connection-oriented network adapter. If the connection-oriented network 114 is an ATM network, then this portion is referred to as an ATM adapter. In a protocol stack, the "ATM adapter" refers to protocol layers below the media access control layer.

Figure 2:
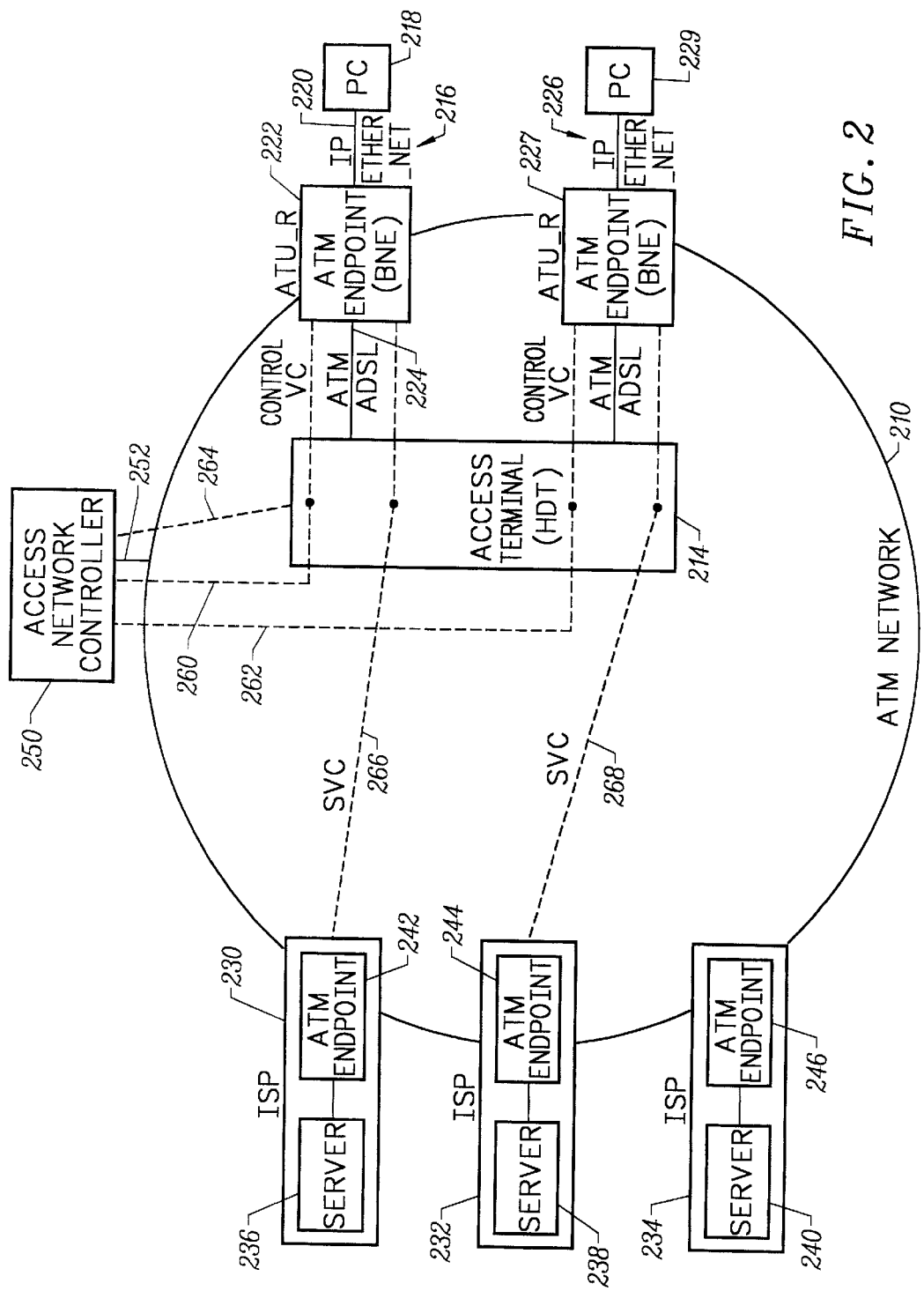
FIGS. 2 and 4 are symbolic diagrams of embodiments of the architecture of FIG. 1.

FIG. 2 is a symbolic diagram of one embodiment of the architecture of FIG. 1. The connection-oriented network is an ATM network 210, which includes an ATM backbone (also sometimes called an ATM cloud), and a number of network access terminals located at various extremities of the ATM cloud. Only one access terminal 214 is shown in FIG. 2. The access terminal 214, also sometimes referred to herein as a Host Digital Terminal (HDT), provides points of access to the ATM cloud for various forms of drops. In some instances, a drop connected to the access terminal does not use ATM, in which case the ATM endpoint is located within the access terminal 214. FIG. 2 illustrates two different drops, both of which continue to use the ATM protocol out to remote endpoints. The overall connection-oriented network 210, therefore, is shown in FIG. 2 as including the communication lines between the access terminal 214 and the remote ATM endpoints.

The embodiment of FIG. 2 shows a data network 216, which includes a plurality of personal computers (only one of which, PC 218, is shown), connected together on a LAN 220. The LAN 220 carries data using an IP over Ethernet protocol. Also connected to the LAN 220 is a Bridging Network Adapter (BNE) 222, which bridges data from the LAN 220 onto the ATM network 210. The BNE 222 is further connected via an ATM over ADSL (for example) link 224 to the HDT 214. ADSL (Asymmetrical Digital Subscriber Line) is a physical layer protocol which is defined in a number of specifications, including American National Standards Institute, Subcommittee, "Telecommunications—Network and Customer Installation Interfaces—Asymmetric Digital Subscriber Line (ADSL) Metallic Interface," ANSI T1.413, Issue 2 (Mar. 14, 1997), incorporated herein by reference. The BNE 222 represents an endpoint of the ATM network 210, and therefore includes an ATM adapter (not shown). The BNE 222 is sometimes referred to herein as an ATM Termination Unit—Remote (ATU-R). Another data network 226 with an ATM endpoint 227 is also shown in FIG. 2.

In the embodiment of FIG. 2, it is assumed that the data network endpoints communicate most often with ISP servers. Three ISP's are illustrated in FIG. 2, therefore, namely ISPs 230, 232 and 234. Each ISP has a respective server 236, 238 and 240 connected via a respective LAN or WAN to respective ATM endpoints 242, 244 and 246 on the ATM network 210.

In the illustration of FIG. 2, the data network endpoints are located in the PC's 218 and 229 and in the servers 236, 238 and 240. They are reachable across the ATM network 210 via respective points of presence within the ATM endpoints 222, 227, 242, 244 and 246. Each of these devices contains an appropriate ATM adapter. The various data network endpoints communicate with each other via a connectionless communication protocol, data carried by which is converted to the connection-oriented ATM protocol by the ATM adapters at each respective point of presence on the ATM network 210.

The embodiment shown in FIG. 2 also includes an Access Network Controller (ANC) 250, which performs a number of control functions with respect to the access terminal 214. It also performs a number of other functions, some of which are described below. The ANC 250 communicates with the access terminal 214 via a link 252 through the ATM network 210. In another embodiment, the ANC 250 could communicate with the access system 214 directly, either instead of or in addition to communicating through the ATM network 210. In yet another embodiment, the ANC 250 could be part of the HDT 214.

Figure 3:
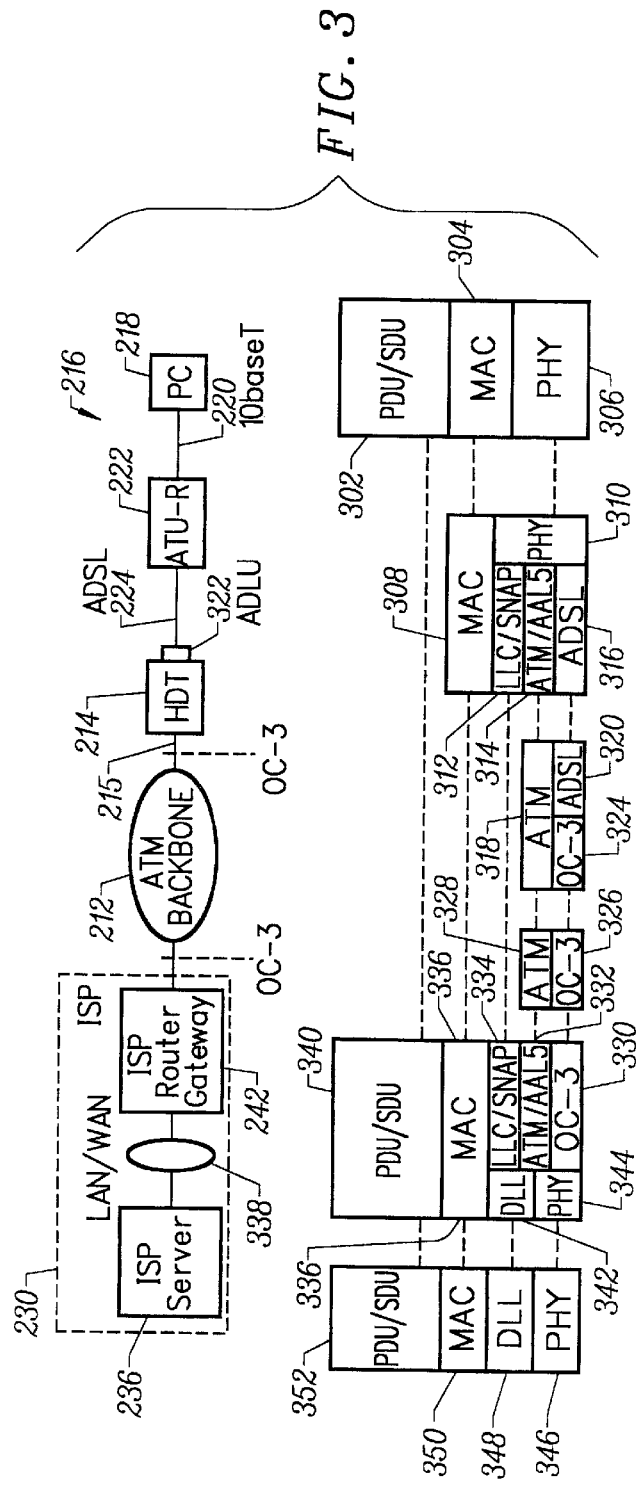
FIG. 3 illustrates protocol data unit encapsulation and extraction performed by certain components in the system of FIG. 2.

FIG. 3 illustrates the protocol data unit encapsulation and extraction performed by each component in the system of FIG. 2, specifically with respect to the data network 216 and one of the ISPs, for example ISP 230. Communication with data network 226 is similar. Specifically, the protocol stacks supported in the various elements of the system are shown. In the PC 218, it can be seen that the protocol stack includes, in addition to other higher layers not shown in FIG. 3, a network layer 302 which provides protocol data unit (PDU) or service data unit (SDU) datagrams, for example IP datagrams, to a MAC layer 304, which packetizes the datagrams according to, for example, IEEE 802.3. The packets provided by the MAC layer 304 are further passed down to the physical layer 306, for transmission out over the wire 220 to the ATU-R 222. The physical layer protocol used in FIG. 3 might be, for example, 10Base-T, defined in ISO/IEC Standard No. 8802-3, Section 14, incorporated by reference herein.

The ATU-R 222 contains two protocol stacks: one for communicating with the PC 218, and the other for communicating with the HDT 214. Since the ATU-R 222 is a bridging network element, the two protocol stacks are common at the MAC level 308. Packets originating with the PC 218 are passed up the protocol stack in the ATU-R 222 to the MAC layer 308 and then passed down the protocol stack on the ATM network side in accordance with the standards set forth in RFC 1483. On the side of the data network 216, below the MAC level 308, is the physical layer 310 which communicates electrically with the physical layer 306 in the PC 218. On the side of the AIM network, below the MAC layer 308, packets being transmitted onto the ATM network are first passed down to an LLC/SNAP layer 312 which, in accordance with RFC 1483, for example, prefixes each packet with an IEEE 802.2 Logical Link Control (LLC) header. This step is referred to herein and in RFC 1483 as LLC encapsulation. The LLC/SNAP layer also inserts a Sub-Network Attachment Point (SNAP) header into each packet to specify the type of bridged medium (in the case of FIG. 3, IEEE 802.3/Ethernet). The LLC/SNAP layer 312 then passes the packet down to an ATM/AAL5 layer, which, again in accordance with RFC 1483, encapsulates the packet (frame) in the AAL5 CPCS/PDU payload field and segments it into ATM cells. The payload format for bridged Ethernet/802.3 PDUs is as follows:

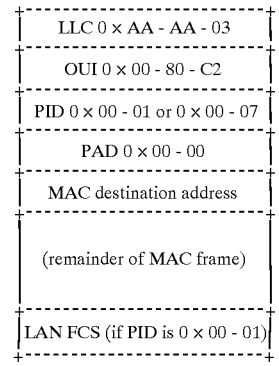

Payload Format for Bridged Ethernet/802.3 PDUs

```
+---------------------------+
| LLC 0 x AA - AA - 03      |
+---------------------------+
| OUI 0 x 00 - 80 - C2      |
+---------------------------+
| PID 0 x 00 - 01 or 0 x 00 - 07 |
+---------------------------+
| PAD 0 x 00 - 00           |
+---------------------------+
| MAC destination address   |
+---------------------------+
|                           |
| (remainder of MAC frame)  |
|                           |
+---------------------------+
| LAN FCS (if PID is 0 x 00 - 01)|
+---------------------------+
```

The LLC/SNAP layer 312 and the ATM/AAL5 layer 314 together make up the ATM adapter layers in the ATU-R 222.

The AIM/AAL5 layer 314 passes the ATM cells down to another physical layer protocol which, in the case of the ATU-R 222, is an ADSL layer 316.

The HDT 214 also includes two protocol stacks, one on the side of the ATU-R 222 and one on the side of the ATM backbone 212. The two protocol stacks are common at the ATM layer 318. Below the ATM layer on the ATU-R 222 side is an ADSL adapter layer 320 (physically within a separate ADLU card 322 in the HDT 214). Below the ATM layer 318 on the ATM backbone 212 side of the HDT 214, is an OC-3 protocol layer 324 which transmits and receives ATM cells according to the SONET ("Synchronous Optical Network") OC-3 and STS-3c protocols.

The ATM backbone 212 includes only a single protocol stack, since it transmits and receives on both sides using ATM over OC-3/STS-3c. Thus an OC-3/STS-3c protocol layer 326 receives data from the HDT 214 via the optical fiber 215, and passes it up to the ATM layer 328, which switches it as necessary and passes it back down to the OC-3/STS-3c layer 326 for transmission to the ISP 230. The layers 328 and 326 are representative of a potentially large number of switching nodes within the overall ATM backbone 212, each of which has its own two layer stack 328–326. It will be appreciated, however, in a degenerate case, that the ATM backbone 212 might not perform any switching at all. That is, it might include only physical layer repeaters, in which case the only layer that would be included in the protocol stack would be 326, not 328; or it could represent merely a straight-through fiber connection, in which case no protocol stack would be present at all.

In the ISP router/gateway 242, which includes the ATM endpoint shown in FIG. 2, two protocol stacks are included. Data arriving from the backbone 212 enters an OC-3/STS-3c physical layer 330, which passes it up to an ATM/AAL5 layer 332, which passes it up to an LLC/SNAP layer 334, which in turn passes it up to a MAC layer 326. The layers 332 and 334 represent an ATM adapter, and perform functions complementary to the layers 314 and 312, respectively, in the ATU-R 222.

Further layers above the LLC/SNAP layer 334 in the ISP router/gateway 242 will vary greatly depending on the structure and network organization of the ISP 230. One example is shown in FIG. 3, in which the MAC layer 336 is common both to the protocol stack on the ATM backbone 212 side of the ISP router/gateway 242, and on the LAN/WAN side 338. A network layer 340 is also common to both sides of the router/gateway 242. Thus, data passed up the protocol stack from the LLC/SNAP layer 334 reaches the MAC layer 336, which extracts and reassembles datagrams for the network layer 340, which performs appropriate routing and passes them back down the protocol stack through the MAC layer 336 to a generalized Data Link Layer (DLL) 342, and down to another generalized physical (PHY) layer 344. Data then passes through the LAN/WAN 338 and up the protocol stack in the ISP server 236. Again this protocol stack can vary widely depending on implementation, but for illustrative purposes it is shown in FIG. 3 as including a physical layer 346, under a data link layer 348, under a MAC layer 350, under another network layer 352. It will be understood that data transmitted from the ISP server 236 to the PC 218 traverses the various protocol stacks of FIG. 3 in the opposite direction and in a complementary manner to that just described.

The protocol stacks of FIG. 3 illustrates the transformations which take place as data is transmitted from one data network endpoint to another across the ATM network 210 (FIG. 2). It can be seen that the information adheres to a connectionless protocol from the network layer 302 in the PC host 218 to the MAC layer 308, and also from the MAC layer 336 out to the network layer 352 of the ISP server 236. In between, that is, from LLC/SNAP layer 312 to the LLC/SNAP layer 334, the data adheres to the connection-oriented ATM protocol. The two "points-of-presence" illustrated in FIG. 3 are considered herein to be at the boundary between MAC layer 308 and LLC/SNAP layer 312 and at the boundary between MAC layer 336 and LLC/SNAP layer 334.

None of this communication can take place, however, until connections are set up across the connection-oriented ATM network 210. As previously mentioned, the establishment of connections across such a network for carrying data generated according to a connectionless protocol has been problematical in the past. In the embodiments described herein, a trigger mechanism is used to cause the connection-oriented network to establish the necessary connection. Particularly with respect to data networks utilizing communication protocols in which a network layer overlies a MAC layer, in which the two layers have different addressing schemes, it is known that hosts and other nodes on the network issue periodic address resolution requests to determine what the MAC level address is which corresponds to a particular desired network layer address. In addition, each node waits until an address resolution reply message is received, before it will begin streaming transmit of data packets to that address. The embodiments set forth herein take advantage of these features and utilize address resolution requests as a trigger for establishing the necessary connections across the connection-oriented network.

Most kinds of nodes on a data network cache network-layer-to-MAC-layer address translations in order to avoid having to issue address resolution requests prior to each packet that they transmit. Because the address mappings are only semipermanent, however, most network agents deliberately age such translations out of their cache if no reference is made to the entry for some predefined age-out period. It will be apparent that if there is no activity through the virtual connection for enough time to cause the ATM network to time-out the virtual connection, then as long as the ATM time-out period is at least as long as the age-out period used by a particular data network node for aging its address translation cache entries, then after any time-out of the virtual connection across the ATM network, the data network node will transmit a new address resolution request before it attempts to transmit any further data packets directed to the same destination. Thus, the use of address resolution packets as a trigger to establish virtual connections across the ATM network is effective even in the presence of network enforced time-outs of virtual connections, as long as such time-out periods are at least as long as data network node address translation cache age-out periods.

Figure 5:
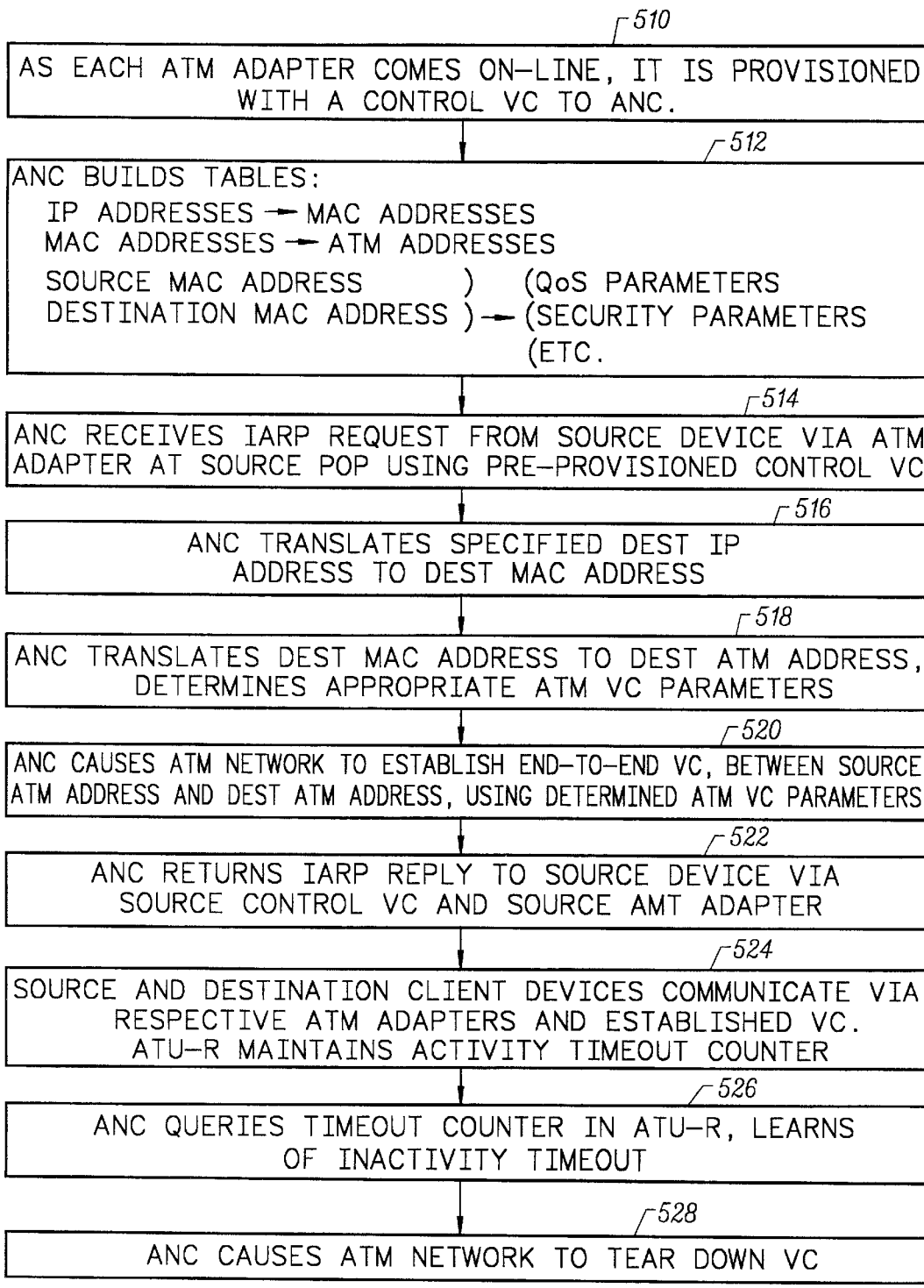
FIG. 5 is a flow chart illustrating certain operations of the network architecture of FIG. 2.

FIG. 5 is a flow chart illustrating the operation of the network architecture of FIG. 2 to take advantage of the above observations. In the embodiment of FIG. 5, the access network controller (ANC) 250 (FIG. 2) is used to control the relevant aspects of network operation.

Referring to FIG. 5, in step 510, as each ATM network endpoint 222 and 227 comes on-line on the ATM network 210, the network 210 automatically provisions the ATM endpoint with a virtual circuit through the HDT 214, the ATM network 210, to the ANC 250. These VC's, referred to herein as "control VC's", are Permanent Virtual Circuits (PVC's) in a typical embodiment. The control VC from the ATU-R 222 to the ANC 250 is illustrated as broken line 260 in FIG. 2, and the control VC from the ATU-R 227 to the ANC 250 is illustrated as the broken line 262 in FIG. 2. The ANC 250 also has a control connection 264 with the HDT 214, and may also have control connections (not shown) with the ATM endpoints 242, 244 and 246 in the ISPs 230, 232 and 234, respectively.

In step 512, which may occur, during and/or after step 510, the ANC 250 builds at least three tables. The first is a table of IP to MAC address translations, indicating the MAC level address of the gateway through which each IP address can be reached. Note that similar tables are frequently built by data network agents and some bridging network adapters, all beyond the edges of the ATM network 210.

The second table built by ANC 250 is a cache of MAC to ATM addresses, each entry of which indicates the point of presence on the ATM network 20 through which a given MAC address can be reached. Note that in an embodiment, this second table can be combined with the first table to create a single table with three columns. The ATM address may be either a native E.164 number up to fifteen digits in length, or an ATM Endsystem Address based upon the ISO NSAP encoding format, all as set forth in detail in Section 3 of the UNI 4.0 document incorporated above.

The third table built by the ANC 250 specifies, given a particular destination MAC address, each of the various parameters that the ATM network 210 would require in order to establish a VC between the point of presence through which the source MAC address can be reached, and the point of presence through which the destination MAC address can be reached. Such parameters include AAL parameters, an ATM traffic descriptor, broadband bearer capability, broadband low layer information, a quality of service (QoS) parameter, the called party number (i.e. the ATM address of the point of presence through which the destination MAC address can be reached), and the calling party number (i.e. the ATM address of the point of presence through which the source MAC address can be reached). Optionally, this table can also include calling party and called party subaddresses and a transit network selection for the VC, as well as other information.

The above three tables can be stored either within the ANC 250 or within some other facility which is accessible to the ANC 250. The ANC can build them from information obtained in any of a number of different ways, and the technique actually used is unimportant for an understanding of the invention. Nevertheless, as examples, the ANC can build the tables by provisioning, and/or by using ATMARP requests and IARP requests.

At some point, a source device (such as PC 218) on data network 216 transmits an IARP request (making the PC 218 an "ARPing client"). In the manner hereinafter described, the ATU-R 222 transmits the IARP request through its control VC 260 to the ANC 250. Thus, in step 514, the ANC 250 receives the IARP request from the source device 218 via the ATM adapter in the ATU-R 222 at the source Point of Presence (POP). The IARP request has the standard format set forth in RFC 826, and is further encapsulated according to the communications protocols of FIG. 3 as appropriate.

In step 516, the ANC 250 acts as an Internet ARP Server "IARPS", using its own IP-to-MAC address translation cache if possible, and translates the specified destination IP address to a corresponding destination MAC address.

Figure 6:
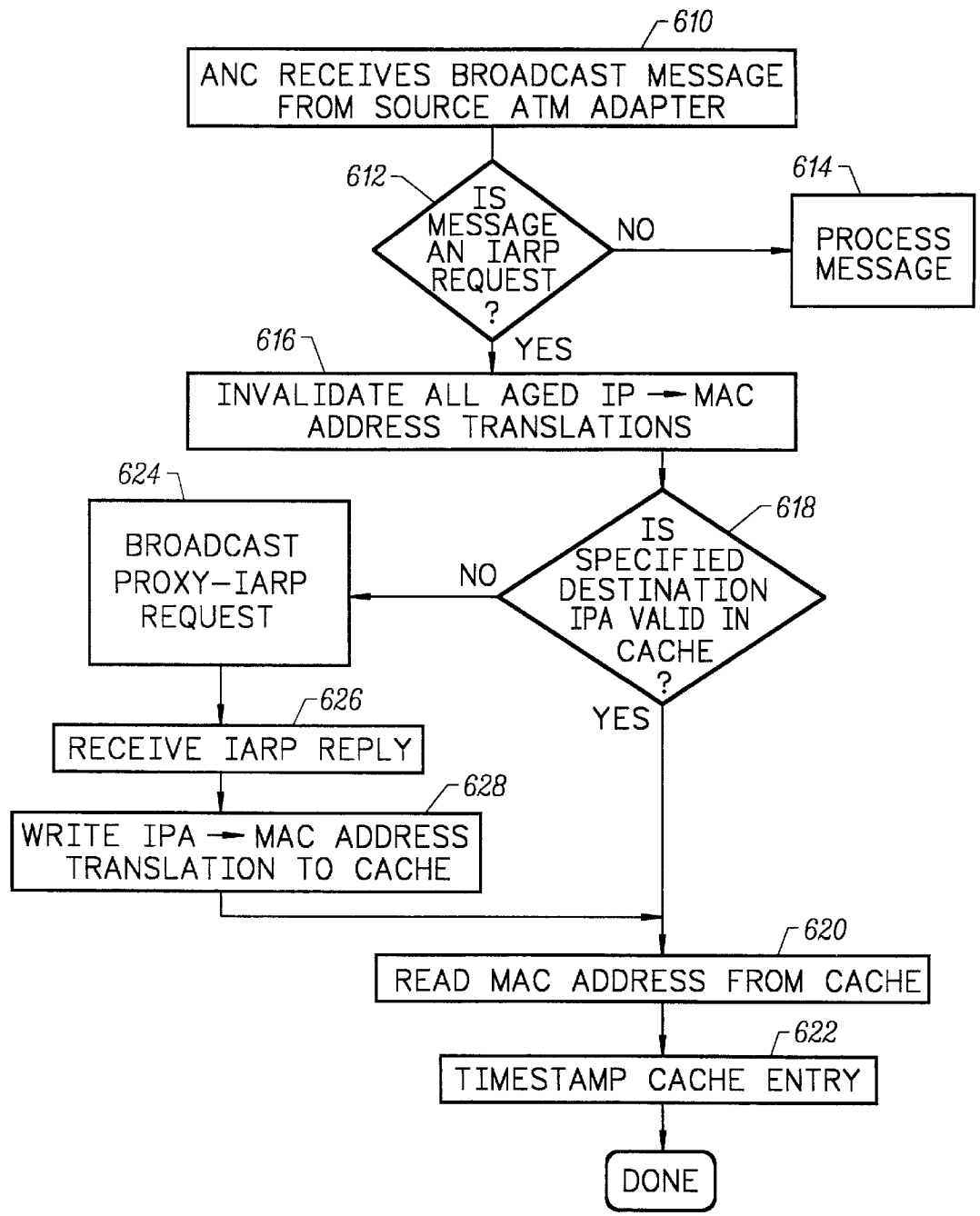
FIG. 6 is a flow chart detailing some steps that take place within step 516 of FIG. 5.

FIG. 6 is a flow chart detailing some of the steps that take place within step 516 (FIG. 5). Initially, it should be noted that in the present embodiment, the ATU-R 222 forwards all broadcast packets that it receives to the ANC 250, not only IARP request packets. Thus, in step 610, the ANC receives a broadcast message from the source ATM adapter in the ATU-R 222. In step 612, the ANC 250 determines whether the message constitutes an IARP request. If not, then in step 614, the ANC processes the message in a manner which is not necessary for an understanding of the present invention.

If the message is an IARP request, then in step 616, the ANC 250 first checks the time stamps on all of the IP-to-MAC address translations in its cache, and invalidates any that have been aged out. Whereas typical data network elements which maintain IP-to-MAC address translation caches typically age their entries out of the cache after periods of inactivity which are on the order of a few minutes, the ANC 250 maintains its cache entries for a much longer period of time, at least ten times as long as more typical data network elements. In the embodiments described herein, the age out period for the ANC's IP-to-MAC address translation cache is on the order of several hours.

In step 618, the ANC 250 determines whether the destination IP address (IPA) specified in the IARP request exists and is valid in the ANC's cache. If so, then in step 620, the ANC 250 reads the corresponding MAC address from its cache, and re-timestamps the cache entry in step 622.

If the destination IP address specified in the IARP request is either not in the ANC's cache or is present but invalid in the ANC's cache, then in a step 624, the ANC 250 broadcasts a proxy IARP request. (On the ATM network 210, such a broadcast is simulated using an appropriate number of replicated, unicast transmissions.) Assuming some recipient of the proxy IARP request knows or is able to obtain the requested translation, in step 626, the ANC 250 will receive an IARP reply message which specifies the MAC address of a gateway through which the desired destination IP address can be reached. As used herein, the term "gateway" can refer to the same or a different network element than that with the desired destination IP address.

In step 628, the ANC 250 writes the received IP-to-MAC address translation into its cache, either overwriting a previously invalidated entry, or if all entries are valid, overwriting the entry with the oldest time stamp. The ANC then proceeds to read the desired MAC address from the cache in step 620 and time stamp the cache entry in 622.

Returning to FIG. 5, in step 518, the ANC 250 translates the destination MAC address now read from the ANC's cache, to a destination ATM address identifying the point of presence on the ATM network 210 through which the destination MAC address can be reached. Again, if this translation is missing or invalid in the cache, then the ANC 250 broadcasts an ATMARP request to obtain it. The ANC 250 also at this time determines the appropriate ATM calling parameters for a VC to be established between the source point of presence and the destination point of presence.

In step 520, the ANC 250 causes the ATM network 210 to establish an end-to-end VC, between the source ATM address and the destination ATM address, using the ATM VC parameters determined in step 518. In the embodiment of FIG. 2, step 520 can be accomplished in a number of different ways. In a first alternative, the ANC 250 provides the destination ATM address and all other ATM VC parameters to the ATM endpoint 222 via the control VC 260. The ATM endpoint 222 then initiates standard ATM call set-up procedures. The call set-up procedures are described in detail in the above-incorporated UNI 4.0, and need not be described herein in detail. Briefly, however, the UNI signaling messages used for point-to-point call/connection control are the following:

| Call Setup | Call Release |
| --- | --- |
| SETUP | RELEASE |
| CALL PROCEEDING | RELEASE COMPLETE |
| CONNECT | |
| CONNECT ACKNOWLEDGE | |

An ATM endpoint initiates a call request by sending a SETUP message to the ATM network. The ATM network processes the call request to determine if the call can be progressed. If so, the network indicates the value of the newly allocated VPCI/VCI (i.e. the identifier of the newly allocated connection) in its first response to the SETUP message, which is either a CALL PROCEEDING or CONNECT message. If a call cannot be accepted, by the network or by the destination ATM endpoint, then a RELEASE COMPLETE is sent to the originating ATM endpoint. At the destination ATM endpoint, the ATM network offers the call using the SETUP message. If the destination endpoint is able to accept the call, it responds with a CONNECT message (which may be preceded by a CALL PROCEEDING); otherwise, it responds with a RELEASE COMPLETE message. Assuming the connection is in fact successful, the ATM endpoint 222 then has a Switched Virtual Circuit (SVC) established through the HDT 214 to the ATM endpoint 242 of the desired ISP 230. The SVC is represented in FIG. 2 by the broken line 266. The ability of an entity such as ATM endpoint 222 to initiate call set-up procedures across the ATM network 210, is sometimes referred to as Q.2931 signaling capability because it is described in the above-incorporated Q.2931 specification.

In many embodiments it is desirable to keep the ATM endpoint as simple and inexpensive as possible. In one such embodiment, therefore, instead of notifying the ATM endpoint 222 of the destination ATM address and ATM VC parameters, the access network controller 250 transmits this information to the HDT 214. Since the HDT 214 is "switchlessly" connected to the ATM endpoint 222, that is, there is only one physical path through which data can be transmitted between the ATM endpoint 222 and the HDT 214, the HDT 214 provides the access to the switching facilities of ATM network 210 for the ATM endpoint 222. In this capacity, the HDT 214 can perform proxy Q.2931 signaling on behalf of the ATM endpoint 222. When the call is complete, the HDT 214 provides the connection identifier to the ATM endpoint 222, which thereafter includes such connection identifier in the header of every ATM cell destined for the same MAC address.

As a third alternative method by which the ANC 250 causes the ATM network 210 to establish the end-to-end VC, the ANC 250 performs its own Q.2931 proxy signaling on behalf of the ATM endpoint 222. Proxy signaling is described in detail in Annex 2 of the above-incorporated UNI 4.0 document.

Figure 4:
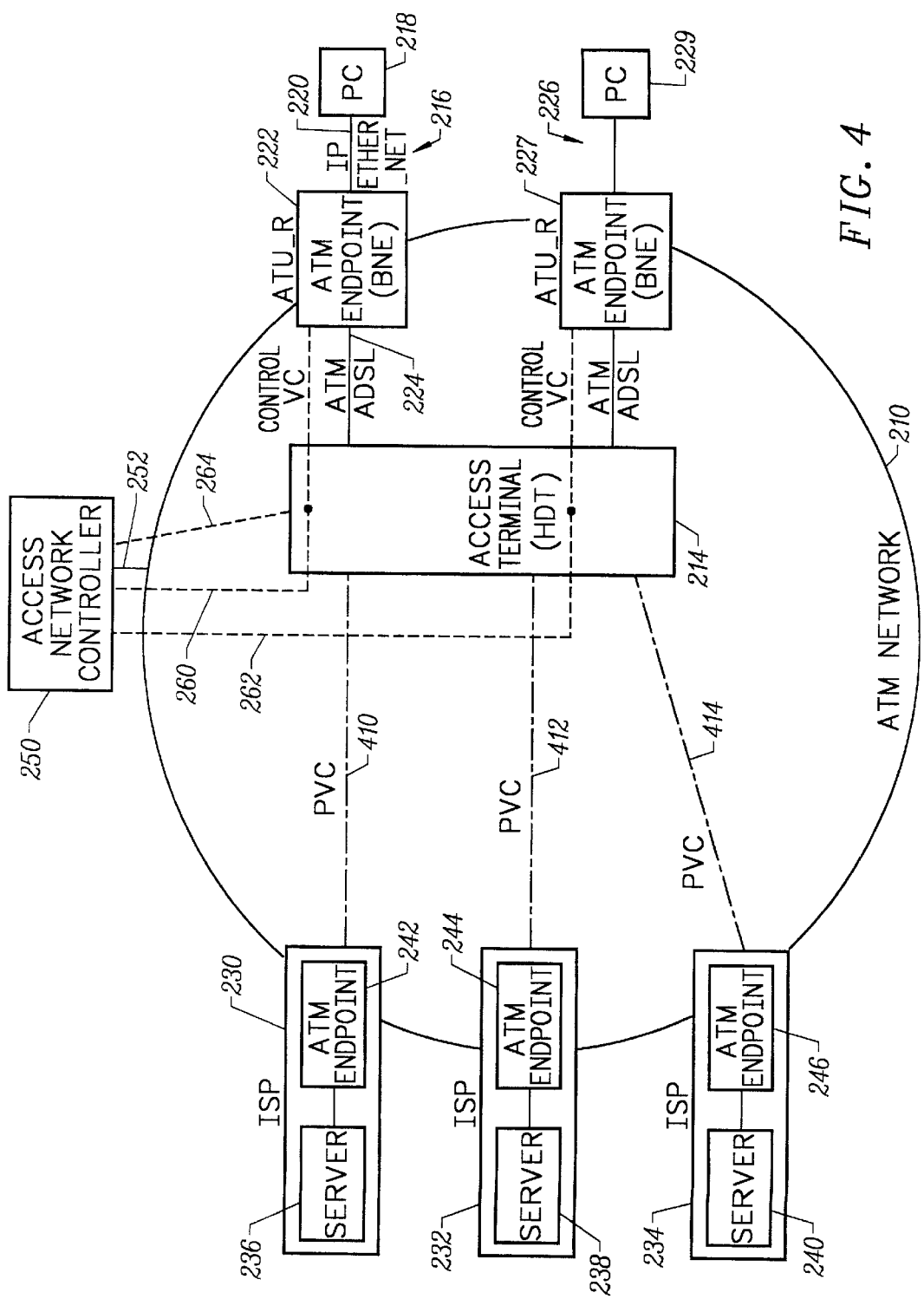

In yet another alternative, at some earlier time, a set of PVCs (within a single PVP) is pre-provisioned between the HDT 214 and each ISP 230, 232 and 234. Such an arrangement is illustrated in FIG. 4, which is the same as the arrangement of FIG. 2 except that the SVCs between the subscriber ATM endpoints and the ISP ATM endpoints have been replaced by the three PVCs 410 (to the ATM endpoint 242 in ISP 230), 412 (to the ATM endpoint 244 in ISP 232) and 414 (to the ATM endpoint 246 in ISP 234). In this alternative, the ATM network 210 is aware only of certain PVPs, while the ATM endpoints 242, 244, 246 and the HDT 214 are aware of the three PVCs 410, 412 and 414. To cause the network to establish the end-to-end VC, the ANC 250 merely directs the HDT 214 and the ATU-R 222 to hook up to the particular PVC 410. No call set-up signaling is required across the ATM network 210.

In yet another alternative implementation of step 520, PVPs are pre-provisioned between the HDT 214 and the individual ISPs as above, and either the ATM endpoint 222, the HDT 214 or the access network controller 250 initiates the call set-up procedures for establishing an SVC through one of the preprovisioned PVPs. In this configuration, only the Q.2931 signaling entity and the ATM endpoints in the ISPs need to support Q.2931 call set-up procedures; the ATM backbone need not support Q.2931. In any event, if it is not the ATM endpoint 222 which initiates the call set-up signaling, then after the SVC is established, the initiating entity notifies the ATM endpoint 222 of the identity of the SVC to use.

Returning again to FIG. 5, after the ANC 250 has either caused the ATM network 210 to establish the desired VC between ATU-R 222 and ATM endpoint 242 in the ISP 230, or has notified either the HDT 214 or the ATU-R 222 of the ATM address and VC parameters to use in setting up the desired VC, in step 522, the ANC 250 then returns the IARP reply to the originating device (PC 218) via the control VC 260 and via the ATM adapter in ATU-R 222. As with the IARP request, the IARP reply packet follows the standard format set forth in RFC826, further encapsulated in accordance with appropriate lower level communication protocols. In embodiments in which the ANC 250 itself controls the call set-up, the ATU-R 222 will not receive the IARP reply until after the VC is complete. In this case, the ATU-R 222 passes the IARP reply message to the originating PC 218. In embodiments in which either the HDT 214 or the ATU-R 222 itself initiate the call set-up functions, the ATU-R 222 holds the IARP reply packet until the VC is complete. Only then does it forward the packet to the originating PC 218. In this manner, the PC 218 will be prevented from transmitting streams of data packets destined for the ISP 230, until after the ATU-R 222 has a complete VC through which to forward them.

In step 524, after receiving the IARP reply message, the PC 218 proceeds to transmit data packets on the LAN 220 destined for the server 236. These packets at the network level include the IP address, and at the MAC level include the MAC address of server 236. The ATU-R 222 recognizes the MAC address as one which can be reached through the VC 266, and after protocol encapsulation, transmits it through the ATM port assigned to that VC. ATM cells enter the ATM backbone via HDT 214 and are received by ATM endpoint 242 and further transmitted to the ISP server 236. ATM cells are also transmitted in the opposite direction. The ATU-R 222 maintains an activity time-out counter, which it restarts in response to each ATM cell carried on the VC 266.

The ANC 250 periodically queries the ATU-R 222 to determine the state of the activity time-out counter. At some point, in step 526, the ATU-R 222 reports that a time-out has occurred. In response to this report, the ANC 250, in step 528, causes the ATM network 210 to tear down the VC 266, thereby releasing network resources. The ANC 250, in one embodiment, initiates the tearing down of the VC 266 by sending a RELEASE message to both ATM endpoints, each of which responds by sending a RELEASE COMPLETE message. Upon receipt of the RELEASE COMPLETE message, the network frees any resources associated with the VC 266.

It may be that the time-out occurred because the PC 218 no longer needs to communicate with the server 266 in ISP 230. In this case, the tear-down is similar to the ANC 250 "hanging up the phone" for the two data network endpoints. On the other hand, it may be that the PC 218 still wishes to communicate with the server 236. In this case, at some later time, higher level software in the PC 218 will once again begin passing messages down the protocol stack. When messages begin to reach the MAC layer 304 (FIG. 3), the PC 218 determines that it no longer has a valid translation from the destination network address to the destination MAC address. It therefore issues an IARP request on the LAN 220, and the process of FIG. 5 repeats from step 514.

The time-out period of the ATU-R 222 inactivity counter can be a fixed value in one embodiment. In another embodiment, the time-out period is set manually depending on the type of client device (such as PC 218) which will be transmitting the IARP requests. For example, it is known that the Microsoft Windows95® TCP/IP protocol stack ages out its address translation cache after a period of two minutes of non-reference. Thus, if it is known that the client device 218 will be a Windows95 PC, then the ANC 250 can time out the connection after, for example, five minutes. Assuming all client devices which utilize ATM endpoint 222 use the Windows95 TCP/IP protocol stack, using five minutes as the inactivity time-out for ATM endpoint 222 guarantees that should the VC 266 be torn down as a result of an inactivity time-out, the client device 218 will always transmit another IARP request before it transmits any new messages of any kind that are addressed to the server 236. Even if the subscriber changes the software on client device 218, or adds other potential sources of messages destined for server 236, the inactivity time-out period is still chosen to be very likely to exceed whatever age-out period the new software or new devices employ for their network-to-MAC translation caches. Thus, for a connection time-out period to be "chosen to be very likely to exceed" the client device's cache age-out periods, it is not necessary that the connection time-out period always succeed in exceeding the client device's cache age-out periods, but the effort is made to succeed most of the time. That is, the effort is made to succeed with at least a significant probability, based on information available at the time the choice is made for the connection time-out period. In addition, as used herein, the term "likely" to exceed includes, as a special case, an embodiment in which the connection time-out period is guaranteed to exceed the client device cache age-out period.

As used herein, a given signal or event is "responsive" to a predecessor signal or event if the predecessor signal or event influenced the given signal or event. If there is an intervening processing element or time period, the given event or signal can still be "responsive" to the predecessor signal or event. If the intervening processing element combines more than one signal or event, the signal output of the processing element is considered "responsive" to each of the signal or event inputs. If the given signal or event is the same as the predecessor signal or event, this is merely a degenerate case in which the given signal or event is still considered to be "responsive" to the predecessor signal or event.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art.

For example, embodiments are described above in which the data network endpoints are at the network layer and the connection endpoints are at the MAC layer, making the connection endpoints equivalent to bridges. The data network endpoints issue ARP requests which act as the trigger when the BNE transmits them to a controller on a connection-oriented network. In other embodiments, other address translations could provide the trigger. The data network endpoint and the connection network endpoint could also be at different levels than the network layer and the MAC layer, and they do not even necessarily need to conform to the OSI network communication layer model. Nor must the trigger in a particular embodiment constitute an address resolution request—any packet type will suffice that is likely to be issued no later than the earliest normal data-containing message issued from the originating data network endpoint after a predetermined time-out period of inactivity.

The embodiments described herein were chosen in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for managing connections on a connection-oriented network having a plurality of points-of-presence including first and second points-of-presence, for use with a plurality of devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, comprising the steps of:

receiving an address resolution request message transmitted by a first one of said devices via said first point-of-presence, for resolving an address specified according to one of said first and second connectionless sub-protocols to an address according to the other of said first and second connectionless sub-protocols, a second device having said specified address being reachable through said connection-oriented network via said second point-of-presence;

controlling said connection-oriented network, in response to said address resolution request message, to establish a connection between said first point-of-presence and said second point-of-presence; and controlling said connection-oriented network to tear down said connection in response to a period of inactivity over said connection exceeding a first predetermined timeout, wherein said first device caches translations from said addressing scheme according to said first connectionless sub-protocol to said addressing scheme according to said second connectionless sub-protocol and ages out cache translations after a predetermined second timeout period of inactivity between said first and second devices, and wherein said first timeout period is chosen to be very likely to exceed said second timeout period.

2. A method according to claim 1, further comprising the steps of:

resolving said specified address to a corresponding address according to said other of said first and second sub-protocols; and transmitting said corresponding address to said first device via said first point-of-presence in an address resolution reply message.

3. A method according to claim 1, further comprising the step, between said step of controlling said connection-oriented network to establish a connection and said step of controlling said connection-oriented network to tear down said connection, of said connection-oriented network carrying messages from said first device via said connection.

4. A method according to claim 3, further comprising the steps, after said step of controlling said connection-oriented network to tear down said connection, of:

receiving a second address resolution request message transmitted by said first device via said first point-of-presence, for again resolving said address specified according to said one of said first and second sub-protocols to an address according to said other of said first and second sub-protocols; and controlling said connection-oriented network, in response to said second address resolution request message, to establish a connection between said first point-of-presence and said second point-of-presence.

5. A method according to claim 1, further comprising the steps of:

caching translations from said first addressing scheme to said second addressing scheme in a translation cache accessible to a controller unit, translations ageing out of said translation cache only after a predetermined third timeout period of inactivity between said first device and said second device via said connection-oriented network; and said controller unit, in response to said address resolution request message, replying to said first device with a translation read from said translation cache, wherein said third timeout period is much longer than said second timeout period.

6. A method for managing connections on a connection-oriented network having a plurality of points-of-presence including first and second points-of-presence, for use with a plurality of devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, said connection-oriented network having a third addressing scheme and said first and second points-of-presence each having an address according to said third addressing scheme, comprising the steps of:

receiving an address resolution request message transmitted by a first one of said devices via said first point-of-presence, for resolving an address specified according to one of said first and second connectionless sub-protocols to an address according to the other of said first and second connectionless sub-protocols, a second device having said specified address being reachable through said connection-oriented network via said second point-of-presence;

caching, in a first cache, address translations from at least one of said first and second addressing schemes on one hand to said third addressing scheme on the other hand; and controlling said connection-oriented network, in response to said address resolution request message, to establish a connection between said first point-of-presence and said second point-of-presence, comprising the steps of:
examining said first cache to determine the address according to said third address scheme of said second point-of-presence; and
providing said connection-oriented network with said addresses according to said third addressing scheme of said first and second points-of-presence.

7. A method for managing connections on a connection-oriented network having a plurality of points-of-presence including first and second points-of-presence, for use with a plurality of devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, said connection-oriented network having a third addressing scheme and said second point-of-presence having an address according to said third addressing scheme, for use with a first connection-oriented network adapter at said first point-of-presence, comprising the steps of:

receiving an address resolution request message transmitted by a first one of said devices via said first point-of-presence, for resolving an address specified according to one of said first and second connectionless sub-protocols to an address according to the other of said first and second connectionless sub-protocols, a second device having said specified address being reachable through said connection-oriented network via said second point-of-presence; and controlling said connection-oriented network, in response to said address resolution request message, to establish a connection between said first point-of-presence and said second point-of-presence, comprising the steps of:
notifying a connection-oriented network adapter at said first point-of-presence of the address, specified according to said third addressing scheme, of said second point-of-presence; and
said connection-oriented network adapter initiating call setup procedures to establish said connection between aid first point-of-presence and said second point-of-presence.

8. A method for managing connections on a connection-oriented network having a plurality of points-of-presence including first and second points-of-presence, for use with a plurality of devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, said connection-oriented network having a third addressing scheme and said second point-of-presence having an address according to said third addressing scheme, for use with a first connection-oriented network adapter at said first point-of-presence, and for use further with an access terminal providing access to switching facilities of said connection-oriented network for said first connection-oriented network adapter, comprising the steps of:

receiving an address resolution request message transmitted by a first one of said devices via said first point-of-presence, for resolving an address specified according to one of said first and second connectionless sub-protocols to an address according to the other of said first and second connectionless sub-protocols, a second device having said specified address being reachable through said connection-oriented network via said second point-of-presence; and controlling said connection-oriented network, in response to said address resolution request message, to establish a connection between said first point-of-presence and said second point-of-presence, comprising the steps of:
notifying said access terminal of the address, specified according to said third addressing scheme, of said second point-of-presence; and
said access terminal initiating call setup procedures to establish said connection between said first point-of-presence and said second point-of-presence.

9. A method for managing connections on a connection-oriented network having a plurality of points-of-presence including first and second points-of-presence, for use with a plurality of devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, said connection-oriented network having a third addressing scheme and said first and second points-of-presence having respective first and second addresses according to said third addressing scheme, comprising the steps of:

receiving an address resolution request message transmitted by a first one of said devices via said first point-of-presence, for resolving an address specified according to one of said first and second connectionless sub-protocols to an address according to the other of said first and second connectionless sub-protocols, a second device having said specified address being reachable through said connection-oriented network via said second point-of-presence; and controlling said connection-oriented network, in response to said address resolution request message, to establish a connection between said first point-of-presence and said second point-of-presence, comprising the step of proxy-signaling call setup procedures to establish said connection between said first point-of-presence and said second point-of-presence.

10. A method according to claim 9, wherein said connection-oriented network comprises an ATM network, wherein said first and second addresses according to said third addressing scheme are E.164 addresses, and wherein said step of proxy-signaling call setup procedures comprises the step of issuing a call setup message identifying said first and second addresses according to said third addressing scheme.

11. A method according to claim 9, for use with a first connection-oriented network adapter at said first point-of-presence, further comprising the steps of:

resolving said specified address to a corresponding address according to said second sub-protocol; and notifying said first connection-oriented network adapter of a correspondence between said connection and said address according to said second sub-protocol.

12. A method according to claim 11, further comprising the steps of:

transmitting said corresponding address to said first device via said first point-of-presence in an address resolution reply message.

13. A method for managing connections on a connection-oriented network having a plurality of points-of-presence including first and second points-of-presence, for use with a first connection-oriented network adapter at said first point-of-presence and a second connection-oriented network adapter at said second point-of-presence, comprising the steps of:

receiving an address resolution request message transmitted by the first connection-oriented network adapter via said first point-of-presence, for resolving an address specified according to one of first and second connectionless sub-protocols of an overall communication protocol to an address according to the other of said first and second connectionless sub-protocols, the second connection-oriented network adapter being reachable through said connection-oriented network via said second point-of-presence;

pre-provisioning a permanent virtual connection (PVC) through at least a segment of said connection-oriented network;

controlling said connection-oriented network, in response to said address resolution request message, to establish a connection between said first point-of-presence and said second point-of-presence, comprising the steps of:

controlling said network to establish a virtual connection through said provisioned connection, said virtual connection having an identity; and notifying said first and second connection-oriented network adapters of the identity of said virtual connection.

14. A method according to claim 13, for use further with an access terminal providing access to switching facilities of said connection-oriented network for said first connection-oriented network adapter, said permanent virtual connection (PVC) extending on one end to said access terminal.

15. A method for managing connections on a connection-oriented network having a plurality of points-of-presence including first and second points-of-presence, for use with a first connection-oriented network adapter at said first point-of-presence and a second connection-oriented network adapter at said second point-of-presence, comprising the steps of:

receiving an address resolution request message transmitted by the first connection-oriented network adapter via said first point-of-presence, for resolving an address specified according to one of first and second connectionless sub-protocols of an overall communication protocol to an address according to the other of said first and second connectionless sub-protocols, the second connection-oriented network adapter being reachable through said connection-oriented network via said second point-of-presence;

pre-provisioning a permanent virtual connection (PVC) through at least a segment of said connection-oriented network; and controlling said connection-oriented network, in response to said address resolution request message, to establish a switch virtual connection (SVC) between said first point-of-presence and said second point-of-presence, comprising the step of an entity initiating call setup procedures to establish said SVC between said first point-of-presence and said second point-of-presence, through said PVC.

16. A method according to claim 15, for use further with an access terminal providing access to switching facilities of said connection-oriented network for said first connection-oriented network adapter, said permanent virtual connection (PVC) extending on one end to said access terminal.

17. A method for managing connections on a connection-oriented network having a plurality of points-of-presence including first and second points-of-presence, for use with first and second devices communicating according to an overall communication protocol, said overall communication protocol comprising a first connectionless sub-protocol having a first addressing scheme, said first connectionless sub-protocol cooperable with a second connectionless sub-protocol in said overall communication protocol, said second connectionless sub-protocol having a second addressing scheme, comprising the steps of:

receiving an address resolution request message transmitted by a first connection-oriented network adapter via said first point-of-presence on behalf of the first device, for resolving an address specified according to one of said first and second connectionless sub-protocols to an address according to the other of said first and second connectionless sub-protocols, the second device having said specified address being reachable through said connection-oriented network via said second point-of-presence;

controlling said connection-oriented network, in response to said address resolution request message, to establish a virtual connection (VC) between said first point-of-presence and said second point-of-presence;

resolving said specified address to a corresponding media access controller (MAC) address according to said second connectionless sub-protocol; and notifying said first connection-oriented network adapter of a correspondence between said virtual connection (VC) and said address according to said second connectionless sub-protocol.

18. A method for managing connections on an asynchronous transfer mode (ATM) network having a plurality of points-of-presence including first and second points-of-presence, for use with a plurality of devices communicating according to a connectionless communication protocol, said connectionless communication protocol comprising a network layer protocol carried according to a media access controller (MAC) layer protocol, comprising the steps of:

receiving an address resolution request message transmitted by a first one of said devices via said first point-of-presence, for resolving a 'specified network address to a MAC address, a second device having said specified network address being reachable through said connection-oriented network via said second point-of-presence; and controlling said ATM network, in response to said address resolution request message, to establish a connection between said first point-of-presence and said second point-of-presence; and controlling said ATM network to tear down said connection in response to a period of inactivity over said connection exceeding a first predetermined timeout period, wherein said first device caches translations from network addresses to MAC addresses, and ages out cached translations after a predetermined second timeout period of non-reference, and wherein said first timeout period is chosen to be very likely to exceed said second timeout period.

19. A method according to claim 18, further comprising the steps of:

resolving said specified network address to a corresponding MAC address; and transmitting said corresponding MAC address to said first device in an address resolution reply message.

20. A method according to claim 18, further comprising the steps, after said step of controlling said ATM network to tear down said connection, of:

receiving a second address resolution request message transmitted by said first device via said first point-of-presence, for again resolving said specified network address to a MAC address; and controlling said ATM network, in response to said second address resolution request message, to establish a connection between said first point-of-presence and said point-of-presence.

21. A method according to claim 18, wherein said first device caches translations from network addresses to MAC addresses, and ages out cached translations after a predetermined second timeout period of non-reference, and wherein said first timeout period is no shorter than said second timeout period.

22. A method for managing connections on an asynchronous transfer mode (ATM) network having a plurality of points-of-presence including first and second points-of-presence, for use with a plurality of devices communicating according to a connectionless communication protocol, said connectionless communication protocol comprising a network layer protocol carried according to a media access controller (MAC) layer protocol, comprising the steps of:

receiving an address resolution request message transmitted by a first one of said devices via said first point-of-presence, for resolving a specified network address to a MAC address, a second device having said specified network address being reachable through said connection-oriented network via said second point-of-presence:

controlling said ATM network, in response to said address resolution request message, to establish a connection between said first point-of-presence and said second point-of-presence; and controlling said ATM network to tear down said connection in response to a period of inactivity over said connection exceeding a first predetermined timeout period.

23. A method for managing connections on an asynchronous transfer mode (ATM) network having a plurality of points-of-presence including first and second points-of-presence, for use with a plurality of devices communicating according to a connectionless communication protocol, said connectionless communication protocol comprising a network layer protocol carried according to a media access controller (MAC) layer protocol, said first and second points-of-presence having respective first and second ATM addresses comprising the steps of:

receiving an address resolution request message transmitted by a first one of said devices via said first point-of-presence, for resolving a specified network address to a MAC address, a second device having said specified network address being reachable through said connection-oriented network via said second point-of-presence:

caching, in a first cache, translations of at least one of network and MAC addresses on one hand to ATM addresses on the other hand; and controlling said ATM network, in response to said address resolution request message, to establish a connection between said first point-of-presence and said second point-of-presence, comprising the steps of:

examining said first cache to determine the ATM address of said second point-of-presence; and providing said ATM network with the ATM addresses of said first and second points-of-presence.

24. A method for managing connections on an asynchronous transfer mode (ATM) network having a plurality of points-of-presence including first and second points-of-presence, for use with a first ATM adapter at said first point-of-presence communicating according to a connectionless communication protocol, said connectionless communication protocol comprising a network layer protocol carried according to a media access controller (MAC) layer protocol, comprising the steps of:

receiving an address resolution request message transmitted by the first ATM adapter via said first point-of-presence, for resolving a specified network address to a MAC address, a second device having said specified network address being reachable through said connection-oriented network via said second point-of-presence;

controlling said ATM network, in response to said address resolution request message, to establish a virtual connection (VC) between said first point-of-presence and said second point-of-presence;

resolving said specified network address to a corresponding MAC address; and notifying said first ATM adapter of a correspondence between said and said MAC address.

25. A method for interfacing a broadcast-capable MAC-level protocol with a connection-oriented non-broadcast network having a plurality of points-of-presence, comprising the steps of:

establishing a first connection from a control port of an agent to a control unit, said agent further having a first content port connectable to said connection-oriented network and a data port connectable to said data network; and said agent re-transmitting on said control port all address resolution request messages received on said data port for resolving a specified network address to a MAC address.

26. A method according to claim 25, further comprising the steps of:

establishing a second connection from said first content port, through a first point-of-presence on said connection-oriented network and a second point-of-presence on said connection-oriented network, to a destination device; and re-transmitting on said first content port packets received on said data port which are addressed to said destination device.

27. A method for supporting a connectionless communication protocol over a connection-oriented network having a plurality of points-of-presence including first and second points-of-presence, comprising the steps of:

detecting a message of a first predetermined type transmitted according to said connectionless protocol by a first device onto said connection-oriented network via said first point-of-presence, messages of said first predetermined type identifying an address, according to said connectionless communication protocol, of a second device reachable over said connection-oriented network via said second point-of-presence;

controlling said connection-oriented network, in response to said message of said first predetermined type, to establish a connection between said first point-of-presence and said second point-of-presence; and controlling said connection-oriented network to tear down said connection in response to a period of inactivity over said connection exceeding a first predetermined timeout period, wherein said first device transmits a message of said first predetermined type no later than transmission from said first device to said second device via said connection-oriented network of the earliest message to be transmitted from said first device to said second device via said connection-oriented network after a predetermined second timeout period of inactivity between said first and second devices, and wherein said first timeout period is chosen to be very likely to exceed said second timeout period.

28. A method according to claim 27, wherein said connectionless communication protocol comprises a first sub-protocol having a first addressing scheme, said first sub-protocol being carried according to a second sub-protocol in said connectionless communication protocol, said second sub-protocol having a second addressing scheme, and wherein said first predetermined type of messages include address resolution request messages for resolving an address according to said first addressing scheme to an address according to said second addressing scheme.

29. A method according to claim 28, further comprising the step of transmitting an address resolution reply message to said first device in response to said message of said first predetermined type.

30. A method according to claim 28, wherein said first predetermined type of messages include IARP request messages.

31. A method according to claim 27, wherein said step of detecting is performed by a controller, for use with an agent which receives messages from said first device and re-transmits them onto said c connection-oriented network, further comprising the step of said agent re-transmitting messages of said first predetermined type received from said first device to said controller and re-transmitting other messages received from said first device to said second device via said connection-oriented network.

32. A method according to claim 27, wherein said connectionless communication protocol comprises a first sub-protocol having a first addressing scheme, said first sub-protocol being carried according to a second sub-protocol in said connectionless communication protocol, said second sub-protocol having a second addressing scheme, and wherein said address identified in said messages of said first predetermined type comprises an address specified according to one of said first and second addressing schemes.

33. A method according to claim 32, wherein said first sub-protocol is a network layer protocol and said second sub-protocol is a MAC layer protocol, and wherein said address identified in said messages of said first predetermined type comprises a network layer address.

34. A method for supporting a connectionless communication protocol over a connection-oriented network having a plurality of points-of-presence including first and second points-of-presence, and comprising the steps of:

detecting a message of a first predetermined type transmitted according to said connectionless protocol by a first device onto said connection-oriented network via said first point-of-presence;

controlling said connection-oriented network, in response to said message of said first predetermined type, to establish a connection between said first point-of-presence and said second point-of-presence, a second device being reachable over said connection-oriented network via said second point-of-presence; and subsequently controlling said connection-oriented network to tear down said connection in response to a first timeout period, wherein said first device transmits a message of said first predetermined type no later than transmission from said first device to said second device via said connection-oriented network of the earliest message to be transmitted from said first device to said second device via said connection-oriented network after a predetermined second timeout period which expires no earlier than said first timeout period.

35. A method according to claim 34, wherein messages of said first predetermined type identify an address, according to said connectionless communication protocol, of said second device.

36. A method according to claim 34, wherein said first timeout period expires in response to a period of inactivity over said connection exceeding a predetermined duration.

* * * * *